(12) United States Patent
Seberger et al.

(10) Patent No.: US 7,911,189 B2
(45) Date of Patent: Mar. 22, 2011

(54) INPUT REGULATED DC TO DC CONVERTER FOR POWER SCAVENGING

(75) Inventors: Stephen G. Seberger, Marshalltown, IA (US); Adam J. Wittkop, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 95 days.

(21) Appl. No.: 12/139,298

(22) Filed: Jun. 13, 2008

(65) Prior Publication Data

US 2009/0015216 A1    Jan. 15, 2009

Related U.S. Application Data

(60) Provisional application No. 60/944,454, filed on Jun. 15, 2007.

(51) Int. Cl.
*G05F 1/613* (2006.01)
*G05F 5/00* (2006.01)
(52) U.S. Cl. .................... 323/222; 323/299; 307/39
(58) Field of Classification Search .......... 323/222, 323/267, 282, 300, 223, 299; 307/15, 34, 307/36, 39
See application file for complete search history.

(56) References Cited

U.S. PATENT DOCUMENTS

| 5,218,235 | A | 6/1993 | Patterson et al. |
| 5,903,139 | A | 5/1999 | Kompelien |
| 6,590,370 | B1 | 7/2003 | Leach |
| 6,977,823 | B2 * | 12/2005 | Yang ................ 363/17 |
| 7,262,693 | B2 * | 8/2007 | Karschnia et al. .......... 340/508 |
| 2005/0052165 | A1 | 3/2005 | Willner et al. |
| 2007/0052396 | A1 * | 3/2007 | Kerth et al. .................. 323/223 |
| 2008/0310195 | A1 * | 12/2008 | Seberger et al. ............. 363/26 |

OTHER PUBLICATIONS

International Search and Written Opinion for PCT/US2008/066971, dated Sep. 24, 2008.

* cited by examiner

*Primary Examiner* — Jeffrey L Sterrett
*Assistant Examiner* — Fred E Finch, III
(74) *Attorney, Agent, or Firm* — Marshall, Gerstein & Borun LLP (57) ABSTRACT

A method of scavenging power in a circuit having a power source generating electric current includes connecting a power scavenging device having an input terminal pair and an output terminal pair to the circuit via the input terminal pair, dynamically regulating a voltage drop across the input terminal pair of the power scavenging device, harvesting electrical energy available at the regulated voltage drop from the electric current flowing through the first input terminal pair of the power scavenging device, and providing the harvested electrical energy at the output terminal pair of the power scavenging device.

35 Claims, 8 Drawing Sheets

INPUT REGULATED DC TO DC CONVERTER FOR POWER SCAVENGING

CROSS-REFERENCE TO RELATED APPLICATIONS

This application claims benefit of the following U.S. Provisional Application Ser. No. 60/944,454, entitled "Input Regulated DC to DC Converter for Power Scavenging" filed Jun. 15, 2007, the disclosure of which is hereby expressly incorporated herein by reference.

FIELD OF THE INVENTION

The present invention relates generally to voltage and power conversion circuits and, more particularly, to a method and apparatus for regulating input voltage of a DC to DC converter.

DESCRIPTION OF THE RELATED ART

DC to DC converters are used in a variety of applications to produce regulated voltage. Some converters, known as step-up or boost converters, generate higher voltage at the output terminals than is available at the input terminals. Conversely, step-down converters generate lower voltage at the output terminals. The DC to DC converters known in the art typically operate by controlling, through dedicated switching circuitry, the timing and the direction of current flowing through an inductor. In particular, these converters cyclically vary the periods of time during which an inductor accumulates and then releases electrical energy in response to the voltage detected by a feedback circuit at the output terminals of the converter. Because the operation of a typical DC to DC converter depends on the output voltage only, the converter takes as much power as necessary from the input terminals in order to produce regulated voltage at the output terminals. For example, in order to provide constant voltage to a load, a typical DC to DC converter will draw more or less power from the input terminals depending on the demands of the load. This property makes the available DC to DC converters unfit for some applications requiring voltage conversion.

In particular, voltage conversion may be required in scavenging circuits. In many industrial and household applications, a current loop consisting of a source and one or more consumers of electrical power includes additional circuitry for redirecting some of the power from the current loop to a secondary load. The process of harvesting power from a primary circuit is usually referred to as "scavenging" and the circuitry required to perform this operation is accordingly referred to as a "power scavenging device." In some cases, scavenging devices may even harvest power from sources other than circuitry, such as sunlight, for example. In other cases, a scavenging device targets excess or unused electrical power from a primary circuit in order to power a smaller load.

Scavenging devices may be used, for example, in 4-20 mA current loops which are widely used in the process control industry to propagate analog signals between field devices and a Distributed Control System, or DCS. Generally speaking, field devices, such as valves, valve positioners, or switches, process control signals by detecting DC current in the 4-20 mA range. Similarly, field devices responsible for taking measurements of process parameters, such as pressure, flow, or temperature sensors, generate signals in the 4-20 mA range and propagate these signals to a DCS over a dedicated pair of wires. In some cases, it may desirable to use some of the power in the 4-20 mA loop to power an additional device, such as radio transceiver, for example. At the same time, it is desirable to limit the voltage drop across a scavenging circuit drawing power from a 4-20 mA loop so that the scavenging circuit does not interfere with the current loop, and, more specifically, with the signaling between a DCS and a field device.

Unfortunately, the available DC to DC converters do not regulate voltage across their input terminals. In order to output constant voltage, these converters consume the necessary power at the input terminals which may sometimes cause an excessive voltage drop across the input terminals. Thus, in order to regulate input voltage and safely scavenge power in a 4-20 mA circuit, or in any other environment characterized by varying loop current, DC to DC converters known in the art require additional circuitry. For example, a dedicated analog circuit could limit the voltage at the input terminals of the converter. However, this limiting circuit would simply waste useful power. Similarly, a parallel shunt circuit could control limit voltage but would also dissipate power through resistors. On the other hand, a feedback circuit could be used to gate the scavenging circuit on and off or, in other words, "pulse" the operation the circuit, but this approach would generate low frequency noise which may interfere with signaling in the current loop.

Further, the converters known in the art do not provide an efficient means of harvesting additional power available at the input. For example, a scavenger load consuming relatively little power will cause the scavenging device to draw this necessary amount of power at the input terminal regardless of the actual capability of the current loop. Just like the power consumption at the output terminals may be excessive and may disturb the current loop, consuming too little power is undesirable because this approach fails to efficiently utilize the current loop. Moreover, there may be instances when the supply current drops significantly and the scavenger load may not receive enough power. In these situations, it is clearly desirable to harvest the extra power available at the input and save it by using such conventional means as a supercapacitor, for example, in order to utilize this saved power when the input power to the scavenging circuit is not sufficient.

Still further, the available DC to DC converters cannot control the rate of change of current flowing through a converter and thus do not provide a way of controlling AC impedance. Meanwhile, it is desirable to provide in-series impedance in some applications so that signals can be efficiently modulated over current loops. For example, the HART communication protocol may communicate over the legacy wiring by modulating signals over the 4-20 mA current. Because modulation requires a certain minimum impedance in order to work efficiently, modulating across a low impedance current loop wastes large amounts of electrical power.

Finally, the use of known DC to DC converters in scavenging devices in a variable current environment does not provide a desired level of operational safety. In particular, the scavenging device may direct the scavenged power to a storage device, such as a capacitor. In a fault condition, the capacitor may discharge the power back to the input terminals and thus create a safety hazard in the current loop. In an explosive environment, the energy discharged by the storage device may trigger an explosion. While the safety could be improved by placing several diodes in series, instead of one typically used in a converter, this approach would significantly degrade the operation of the circuit. Moreover, a short circuit inside the DC to DC controller could also cause this problem and thus provide another path for the transfer of energy back to the input terminals.

SUMMARY

A method of scavenging power in a current loop involves inserting a scavenging device in series with a power source and a power consuming device, regulating the voltage drop across the input terminals of the scavenging device, and providing power at the output terminals available from the controlled voltage drop and the loop current. In particular, voltage drop across the scavenging device is regulated by means of a feedback circuit generating an input voltage signal and a regulator circuit using the input voltage signal to control the timing of charging and discharging an inductor. The regulator circuit may be a conventional DC to DC converter or a circuit having several discrete components such as comparators.

In one aspect, the power source is a variable current or voltage source. In another aspect, the scavenging device is a DC to DC converter using a feedback circuitry to regulate the input voltage. In one embodiment, the input regulated DC to DC converter maintains a substantially constant voltage across the input terminals. In another embodiment, the input regulated DC to DC converter adjusts the voltage across the input terminals according to the input current so that more available power is scavenged when the loop current is low. In another embodiment, the input regulated DC to DC converter further includes an isolation transformer at the output in order to prevent energy from being transferred back to the input terminals in a fault condition. In this respect, the use of an isolation transformer improves Intrinsic Safety of the scavenging device. In another embodiment, the input regulated DC to DC converter further provides a line filtering function in order to increase impedance in the current loop and thus allow for modulation across the loop.

DETAILED DESCRIPTION OF THE DRAWINGS

DETAILED DESCRIPTION

Figure 1:
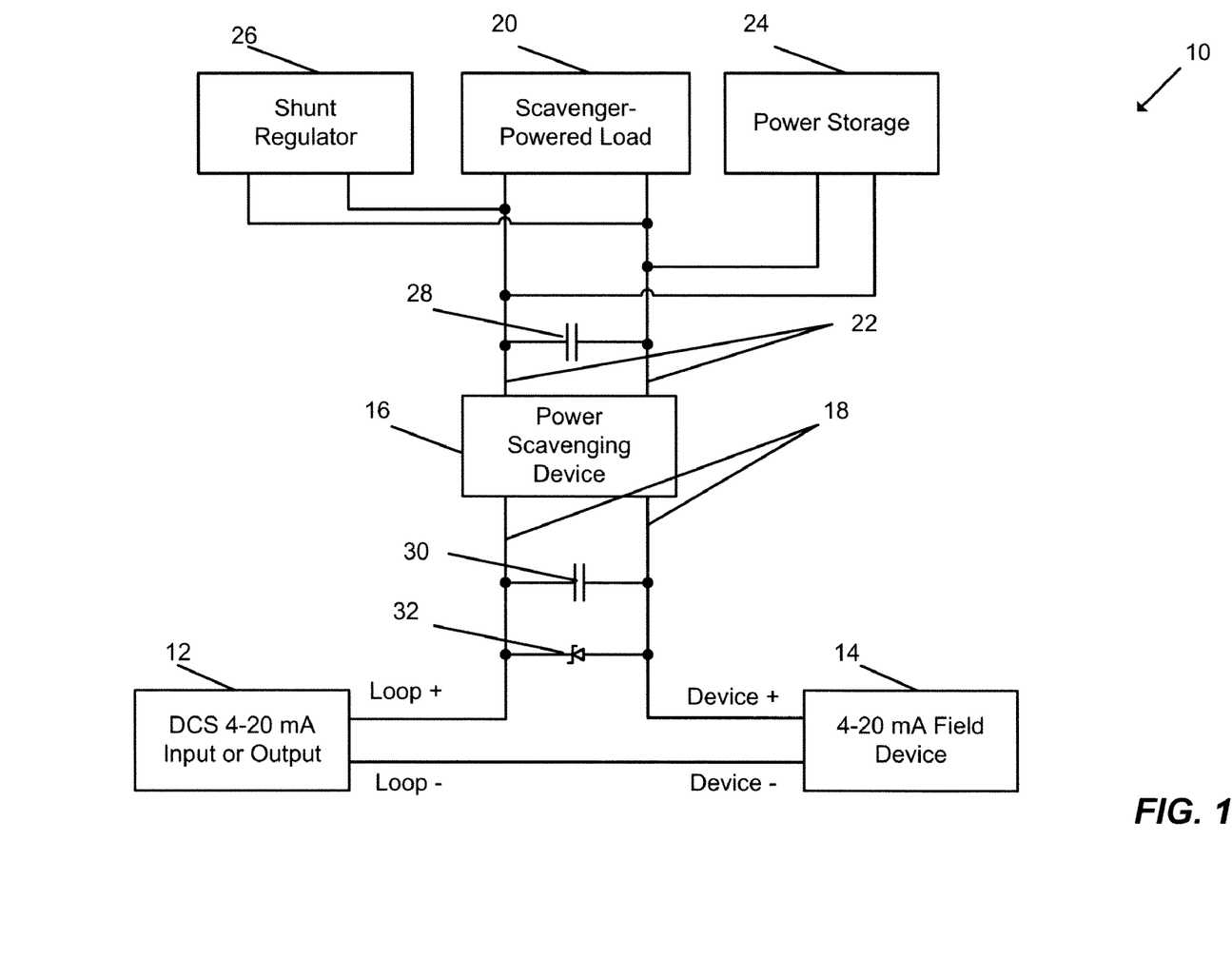
FIG. 1 is a schematic representation of a circuit in which an input regulated DC to DC converter, used as a power scavenging device, may be utilized to harvest excess power.

FIG. 1 is a schematic representation of a system in which an input-regulated power scavenging device may be used to efficiently harvest excess power from a current loop and direct the excess power to a load, a storage device, or both. As illustrated in FIG. 1, a current loop or circuit 10 includes a Distributed Control System (DCS) 12, a field device 14, and a power scavenging device 16 connected in series with the field device 14. These and other circuit elements illustrated in FIG. 1 are connected in a wired manner.

In operation, the DCS 12 and the field device 14 send and receive 4-20 mA analog signals in a manner unpredictable to the scavenging device 16 implemented as an input regulated DC to DC converter. In other words, from the perspective of the scavenging device 16, the current in the loop 10 may uncontrollably vary with time in the 4 to 20 mA range. The power scavenging device is connected to the loop 10 in series through a pair of input terminals 18, with one of the contacts of the pair 18 connecting directly to the positive terminal of the DCS 12 and the other contact connecting directly to the positive input of the field device 14. However, the scavenging device 16 may instead be connected to the respective negative terminals of the DCS 12 and field device 14. During operation, the power scavenging device 16 creates a regulated voltage drop across the input terminals 18. The scavenging device 16 may maintain the voltage at a constant level and thus vary the power consumption at input terminals 18 linearly with the current flowing through the scavenging device 16. The scavenging device 16 may then transfer the power harvested from the input terminals 18 to one or more devices or circuits connected to the output of the scavenging device 16. In another embodiment, the scavenging device 16 may regulate the input voltage according to the current flowing through the scavenging device 16. In particular, the scavenging device 16 may increase the voltage drop across the input terminals 18 as the current through the scavenging device 16 decreases.

A scavenger-powered load 20 may be connected to the power scavenging device 16 through a pair of output terminals 22. The scavenger load 20 may be any type of device consuming either constant or variable power. For example, the scavenger load 20 may be a simple electrical element characterized by constant power consumption such as a light emitting diode (LED), for example, or a complex device with varying power demands such as a radio transceiver. It will also be appreciated that while only one scavenger powered load is shown in FIG. 1, the power scavenging device 16 may supply power to multiple loads with different power consumption characteristics.

The scavenging device 16 may be also connected to a power storage 24. The power storage 24 may be, for example, a single supercapacitor, a relatively complex circuitry involving several capacitors connected in parallel, or other means of storing power known in the art. As one skilled in the art will recognize, a capacitor may be used as a power storage device because the voltage across a capacitor will increase as current arrives at the capacitor. A high density capacitor, or a supercapacitor, is capable of storing a high amount of charge and may thus be preferable as a power storage device.

Additionally, an adjustable shunt regulator 26 may be connected across the pair of output terminals 22 in parallel with the scavenger-powered load 20 and the power storage 24. The shunt regulator 26 may be used to dissipate the unnecessary power if the scavenger-powered load 20 does not consume all the power available at the output terminals 22. The shunt regulator 26 may be necessary if the power storage 24 is not provided. In other embodiments, it may be preferable not to use a shunt regulator in the loop 10 at all and save all of the excess power from the output terminals 22 in the power storage 24. The adjustable shunt regulator 26 may be implemented in any manner known in the art such as, for example, by using a zener diode and resistors.

As yet another option, a capacitor 28 may be connected across the output terminals 22 in order to filter out the output voltage. Because the output of the power scavenging device 16 is unregulated, the capacitor 28 may be used to smooth out the output voltage particularly if a scavenger powered load 20 is present in the circuit 10. In this sense, the capacitor 28 may be part of a post-regulating circuitry. However, the capacitor 28 may not be necessary if the power scavenging device 16 supplies power primarily to the power storage device 24. In fact, the unregulated aspect of the output at the terminals 22 may actually be desirable if the power at the output terminals 22 is transferred to the power storage 24.

Meanwhile, an input filter capacitor 30 connected across the input terminals 18 the power scavenging device 16 may serve to filter out the input noise. As one skilled in the art will recognize, an input filter capacitor is needed at the input of any DC to DC circuit. The capacitance of the input filter capacitor 30 is a function of the operating frequency of the DC to DC converter used in the power scavenging device 16. Additionally, the voltage across the input terminals 18 may be clamped in order to prevent a failure in the scavenging device 16 from interrupting current flow in the loop 10. For example, a zener diode 32 may be used to ensure that if the voltage across the input terminals 18 rises above a certain limit, the diode will break down and the current will flow in the direction of the 4-20 mA field device 14. One of ordinary skill in the art will recognize that the limit is determined by the physical properties of the selected diode.

The capacitors 28 and 30, the shunt regulator 26, and the zener diode 32 may be included in the power scavenging device 16. Depending on the intended field of application, the power scavenging device may be adapted to regulate the output voltage by means of a shunt circuit 26 or to direct all of the available power to a power storage device 24. It is contemplated that several configurations, with some of the components illustrated in FIG. 1 omitted and some additional components added according to the desired application, may be placed into Application Specific Integrated Circuits (ASICs). Alternatively, the scavenging device 26 may be provided as a separate ASIC which can then used in any configuration discussed herein. As yet another alternative, parts of the circuitry of the power scavenging device may be manufactured as a separate chip working in cooperation with a conventional DC to DC converter.

Figure 2:
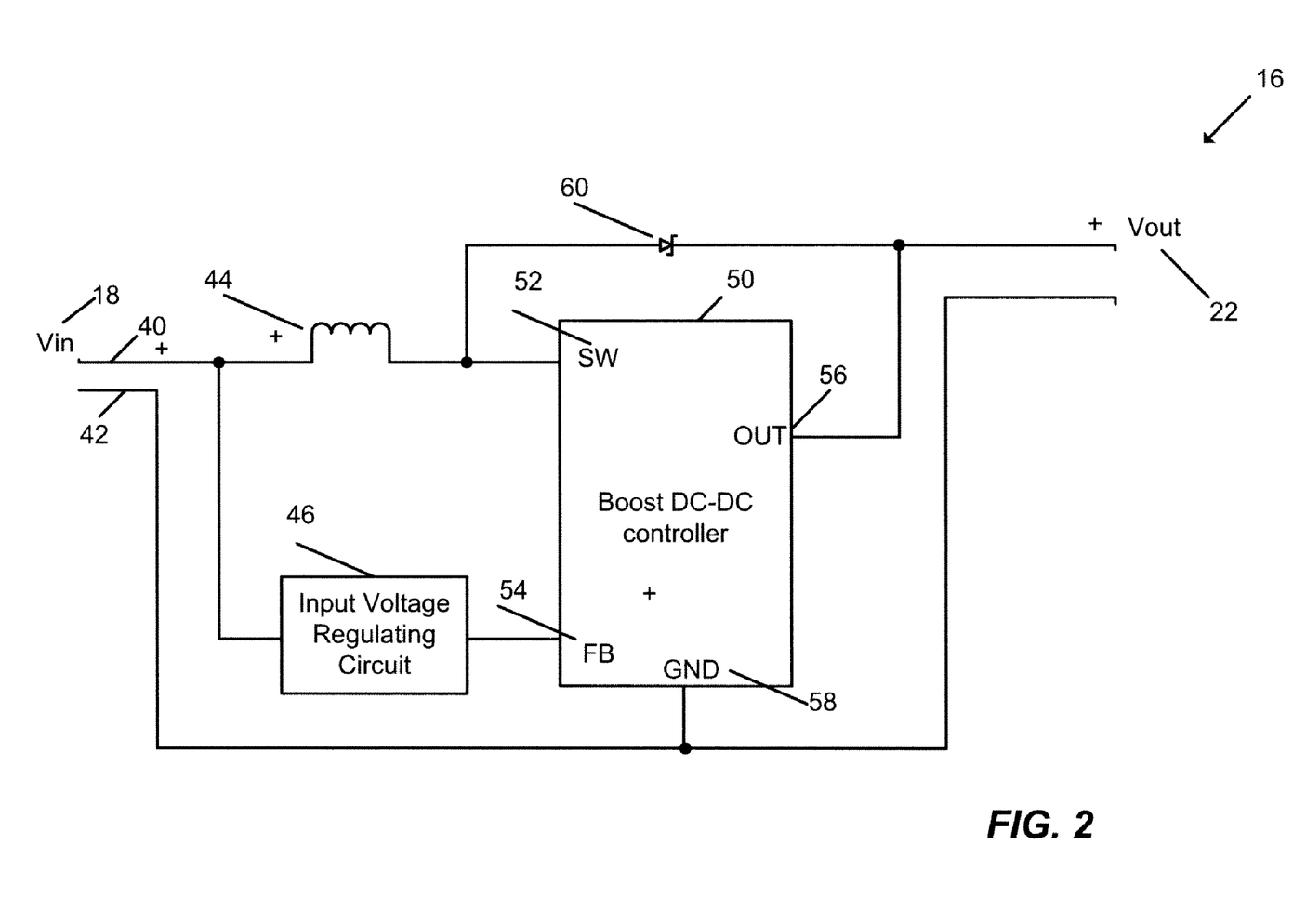
FIG. 2 is a schematic representation of an input regulated DC to DC converter.

FIG. 2 illustrates the power scavenging device 16 in more detail. In accordance with the layout shown in FIG. 1, the current enters the power scavenging device 16 at the positive terminal 40 of the input terminal pair 18 and leaves through the negative terminal 42. After entering via the positive terminal 40, the current flows to the positive terminal of the inductor 44. Additionally a relatively small part of the current flows to the input regulating circuit 46. The same or substantially same amount of current that enters through the positive terminal 40 leaves through the negative terminal 42. Meanwhile, the circuitry implemented according to the teachings of the present disclosure and discussed in detail below maintains a regulated drop across the terminals 40 and 42. For example, the voltage drop across the terminals 40 and 42 of a scavenging device used in a 4-20 mA current loop may be maintained at a constant 1V.

Referring again to FIG. 2, a boost DC to DC controller 50 regulates the amount of time the inductor 44 accumulates current. The controller 50 may be an off-the-shelf chip such as On Semiconductor NCP1421 or a circuit assembled from several discrete IC components capable of performing a high frequency switching function and to regulate the duty cycle of a switched circuit according to a feedback signal. In particular, the controller may use one or more Metal Oxide Semiconductor Field Effect Transistors (MOSFETs), for example, to quickly open and close electrical connections. The controller adjusts the timing between opening and closing the connections according to the parameters of the oscillation circuit components used in the controller and to the feedback signal, such as current or voltage. In this sense, the controller 50 may provide Pulse Width Modulation (PWM) with a controlled duty cycle to the circuitry of the power scavenging device 16. It will be appreciated that the switching functionality can also be implemented by using discrete semiconductors, OTS integrated circuits, or other components and materials known in the art.

As illustrated in FIG. 2, the controller 50 is equipped with a switch pin 52, a feedback pin 54, an output pin 56, and a ground pin 58. It will be appreciated that the controller 50 may have additional inputs and is not limited to the four pins listed above. As illustrated in FIG. 2, switch pin 52 is electrically connected to the negative terminal of the inductor 44, the output pin is connected to one of the output terminals 22, and the ground pin 52 is electrically connected to the opposite terminal of the terminal pair 22 and to the negative input terminal 42. Further, the feedback pin 54 is connected to the output of the input regulating circuit 46.

During each cycle of operation, the controller 50 first directs the input to the switch pin 52 to the ground pin 58. While the pins 52 and 58 are connected, the current builds up in the inductor 44. Next, the controller 50 disconnects the pins 52 and 58. The collapse of the magnetic field in the inductor 44 pushes the current from the inductor 44 to the positive side of the output terminal pair 22. Referring again to FIG. 2, the negative terminal of the inductor 44 may be connected both to the switch pin 52 and to the positive side of the output terminal pair 22 via a flyback diode 60. The flyback diode 60 is preferably a Schottky diode but may also be a different type of a diode. The flyback diode 60 provides synchronous rectification to the output of the inductor 44. However, if the controller 50 is already capable of synchronous rectification, a flyback diode may not be required.

Referring again to FIG. 2, some of the current entering the scavenging device 16 at the terminal 40 is directed to the input voltage regulating circuit 46. The circuit 46 may generate a voltage signal indicative of the strength of the current at the input terminal 40. The controller 50 uses the signal generated by the regulating circuit 46 in order to selectively increase or decrease the production of power at the output terminal pair 22. For example, the controller 50 may increase the duty cycle of the pulses and thus lower the input voltage across the terminal pair 18 in response to the voltage level detected by the circuit 46. The implementation of the circuit 46 is discussed in greater detail below.

Figure 3:
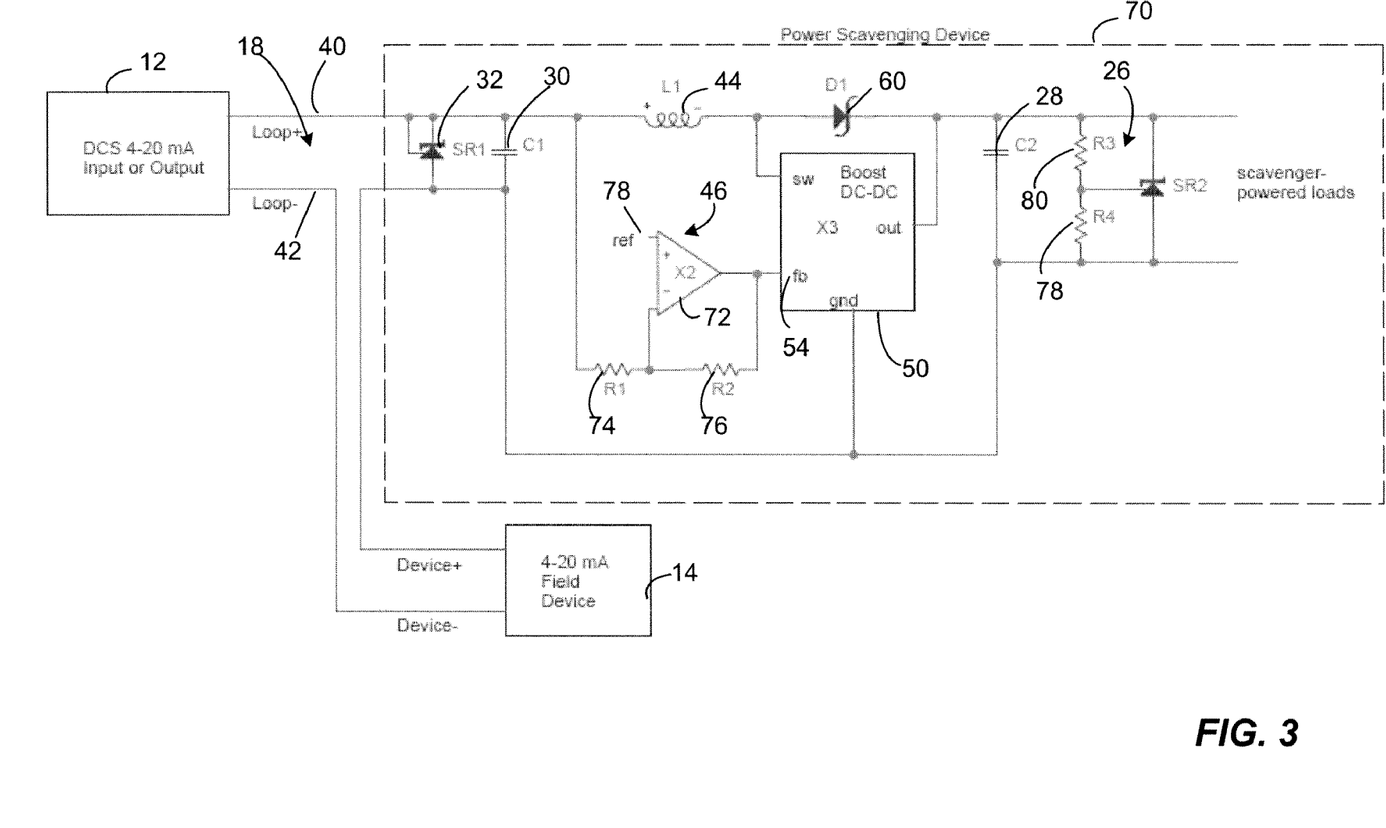
FIG. 3 is an electrical diagram illustrating an input regulated DC to DC converter in one possible circuit configuration.

FIG. 3 illustrates an electrical diagram of one possible embodiment of a power scavenging device 70. In this configuration, the power scavenging device 70 incorporates both a diode 32 to clamp the voltage at a desired level and an input filter 30. Importantly, in the configuration depicted in FIG. 3, the output voltage is controlled by the shunt circuit 26. As indicated above, this configuration may be useful if an input regulated DC to DC converter is used to power a load requiring a constant voltage. The shunt circuit 26 will dissipate the excess power and ensure that the power load does not receive more power than is required.

The input voltage regulating circuit 46 includes an operational amplifier 72 and resistors 74 and 76. The amplifier 72 may use the reference voltage 78 at its non-inverting input and the variable voltage at its inverting input to control the relationship between the input voltage across the terminals 40 and 42 and the voltage supplied to the feedback pin 54. One skilled in the art will appreciate that the values of the resistors 74 and 76 may be selected according to the desired voltage drop. As discussed above, in a typical 4-20 mA loop, such as one used in the process control industry, a voltage drop of 1V across the scavenging unit 16 or 72 is usually tolerable. Similarly, resistors 78 and 80 used in the shunt circuit 26 may be selected according to the desired voltage output.

Figure 4:
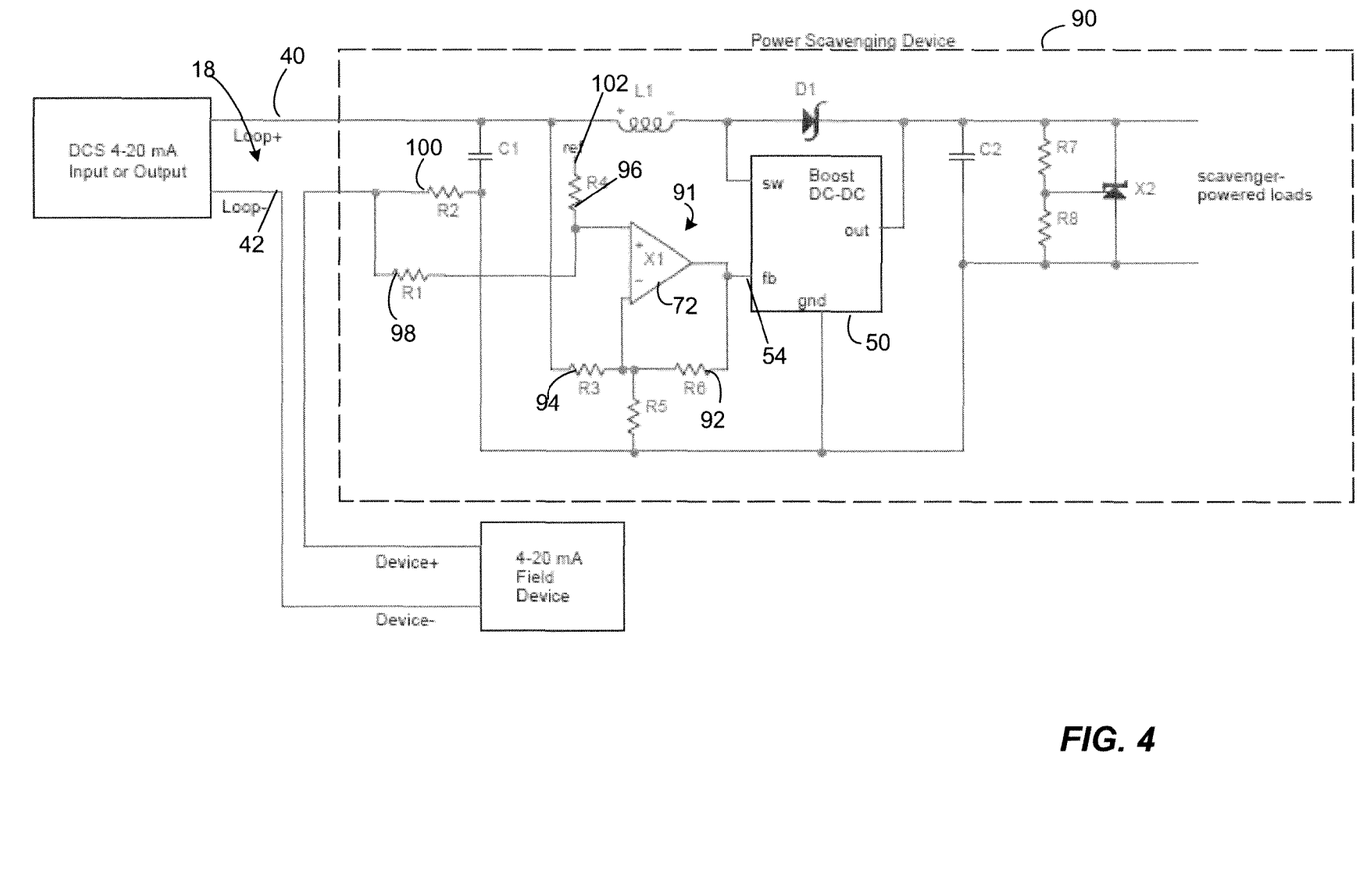
FIG. 4 is an electrical diagram of an input regulated DC to DC converter with inverse current-dependent voltage drop.

FIG. 4 illustrates another contemplated embodiment of an input regulated DC to DC converter which can be used for power scavenging. A power scavenging circuit 90 may include most of the elements of the power scavenging device 70 discussed above. Additionally, the power scavenging circuit 90 may regulate the input voltage in a more efficient and practical manner than the scavenging device 70. In particular, the control loop 10 may experience lower voltage drops across various circuit elements such as the field device 14 when the current in the loop 10 is lower. In the case of a 4-20 mA circuit used in the process control industry, for example, the DCS 12 will "see" a lower voltage drop across the loop when it generates a 4 mA signal and, conversely, the DCS 12 will see a higher voltage drop when the analog signal is closer or at the 20 mA level. Similarly, a field device such as the device 14 will typically see a lower or higher voltage drop across the DCS 12 when the field device generates, rather than receives, a 4-20 mA signal. Thus, the loop 10 may tolerate larger voltage drops across the scavenging circuit 16, 70, or 90 at lower loop currents.

The power scavenging device 90 illustrated in FIG. 4 draws more power from the input terminal pair 18 at lower input currents entering the scavenging device 90 through the terminal 40 than the scavenging device 70, for example, because the device 90 drops more voltage across the terminal pair 18. Clearly, this feature may be desirable if the scavenger-powered load 20 has high-power requirements. In particular, a regulating circuit 91 including the amplifier 72, a gain-limiting component or resistor 92, and resistors 94-100 regulates the voltage across the terminal pair 18 so that the input voltage varies inversely with the input current as sensed by the circuit 91. The elements 92-100 as well as the reference voltage 102 are selected and connected in a manner that that generates a larger feedback signal from the regulating circuit 91 to the feedback pin 54 when the input current is larger. In this sense, the scavenging device 90 utilizes the negative impedance of the regulating circuit 91. Thus, in response to a larger signal at the feedback pin 54, the controller 50 will reduce the duty cycle of the PWM and thus reduce the amount of power pumped to the output terminals 22. Similarly to the power scavenging devices 16 and 70, the scavenging device 90 regulates the input voltage irrespective of the output of the scavenging device 90.

It will be further appreciated that the inverse relationship between the input current voltage supplied to the feedback pin 54 may be implemented by other means known in the art. In the embodiment illustrated in FIG. 4, for example, the resistor 100 functions as the output current sensor because the current returning from the scavenging device 90 to the output terminal 42 must pass through the resistor 100. However, any known means of sensing the current may be similarly used to regulate the feedback pin 54 of the controller 50 and thus vary the amount of power drawn by the scavenging device 90.

Figure 5:
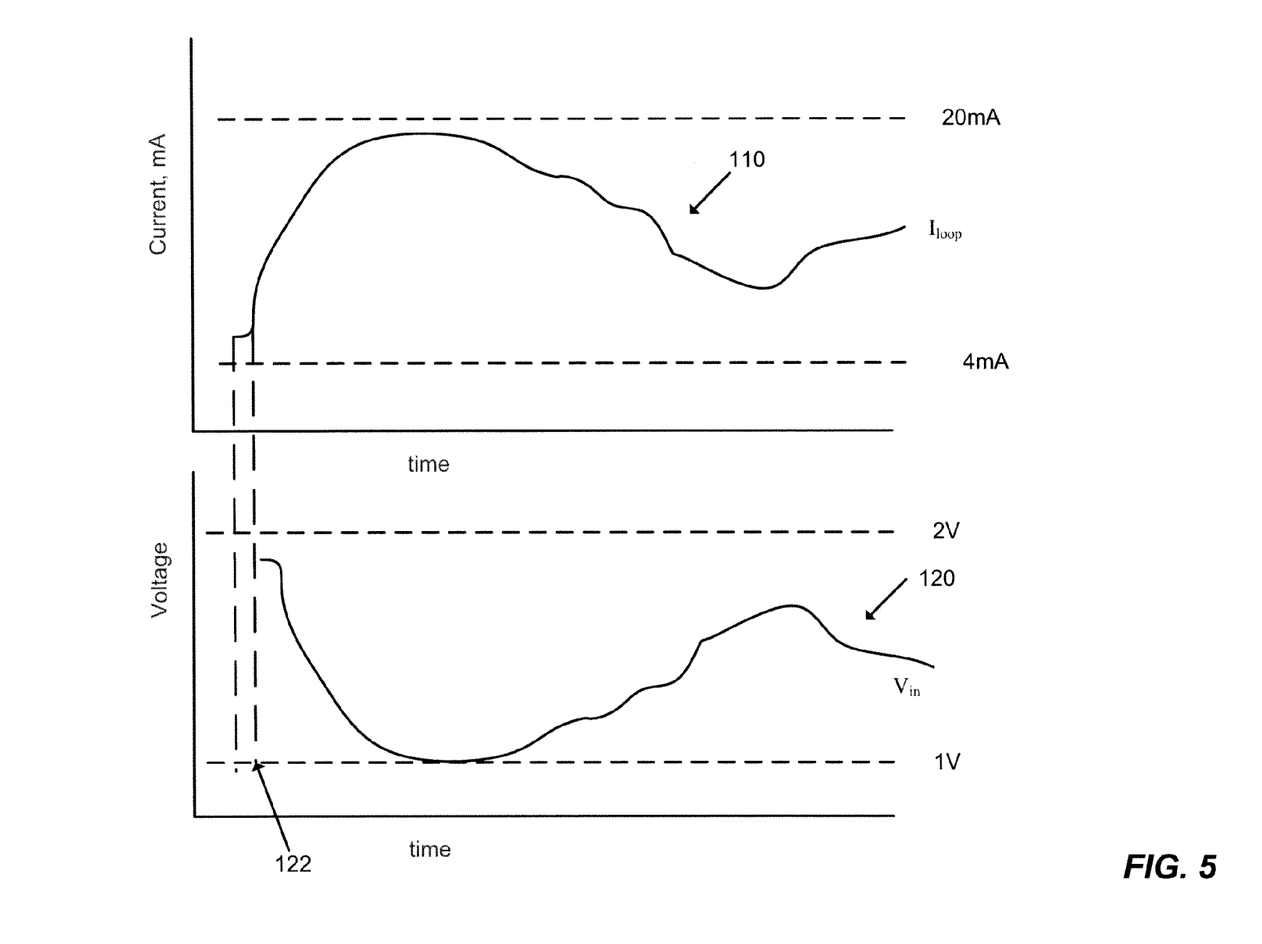
FIG. 5 is an illustration of exemplary input current and voltage waveforms regulated by a converter consistent with one of the embodiments.

Generally speaking, it is desirable to select the circuit element parameters in view of the maximum tolerable voltage drop. For example, it is prudent to select the resistance values of the resistors 92-100 according to the voltage drop tolerable at 20 mA if the scavenging device 90 is intended for use in a process control industry. FIG. 5 illustrates an exemplary input and voltage at the input of the power scavenging device 90 connected in a 4-20 mA loop as functions of time. In particular, the waveform 110 may be the current flowing through the input terminal 40 while the waveform 120 may be the voltage across the input terminal pair 18. Both waveforms are depicted on a relatively large time scale, such as seconds. As illustrated in FIG. 5, the inverse relationship between the input voltage and the input current ensures that the waveform 120 appears to be a mirror reflection of the waveform 110. It will be also appreciated that the waveform 120 may appear as having a delay 122 relative to the waveform 110 which may be in the order of micro- or even nanoseconds. The scavenging unit 90 maintains the voltage drop within the 1-2 V range as a function of the input current only and independently from the voltage or power requirements at the output terminals 22.

Another desirable aspect of operation of any scavenging device is safety and, in particular, the Intrinsic Safety (I.S.) standards accepted in many industries. Generally speaking, I.S. certification associated with a device places specific energy limitations on this device. For example, handheld HART communicators are limited to $V_{oc}<=2V$ and $I_{sc}<=32$ mA, where $V_{oc}$ is the maximum voltage across the communicator and $I_{sc}$ is the maximum current allowed through the communicator. The I.S. standards associated with a HART communicator may be used as a guideline to designing a safe scavenging device for use in a 4-20 mA because providing power to HART communication circuit is a highly probable field of power scavenging application.

As discussed above, boost DC to DC converters known in the art may draw too much power from the input terminals and interfere with the operation of the circuit from which the power is being scavenged. This type of interference may prevent devices from receiving power or signals propagated through the circuit. On the other hand, the conventional DC to DC converters may also fail to contain the scavenged power in a fault condition and damage the circuit by releasing the energy back into the circuit, especially if the scavenged-powered load is a capacitor or a similar power storage device. This type of failure may be more dangerous than overdrawing power from the circuit. If used in the process control industry, for example, the conventional boost DC to DC converters may carry a high potential risk at least because a 4-20 mA loop may connect devices in an explosive or otherwise hazardous environment. Thus, energy in the loop may cause a spark thereby triggering an explosion. However, meeting the safety standards discussed above by any conventional means would inevitably reduce the power efficiency of a boost DC to DC converter.

Figure 6:
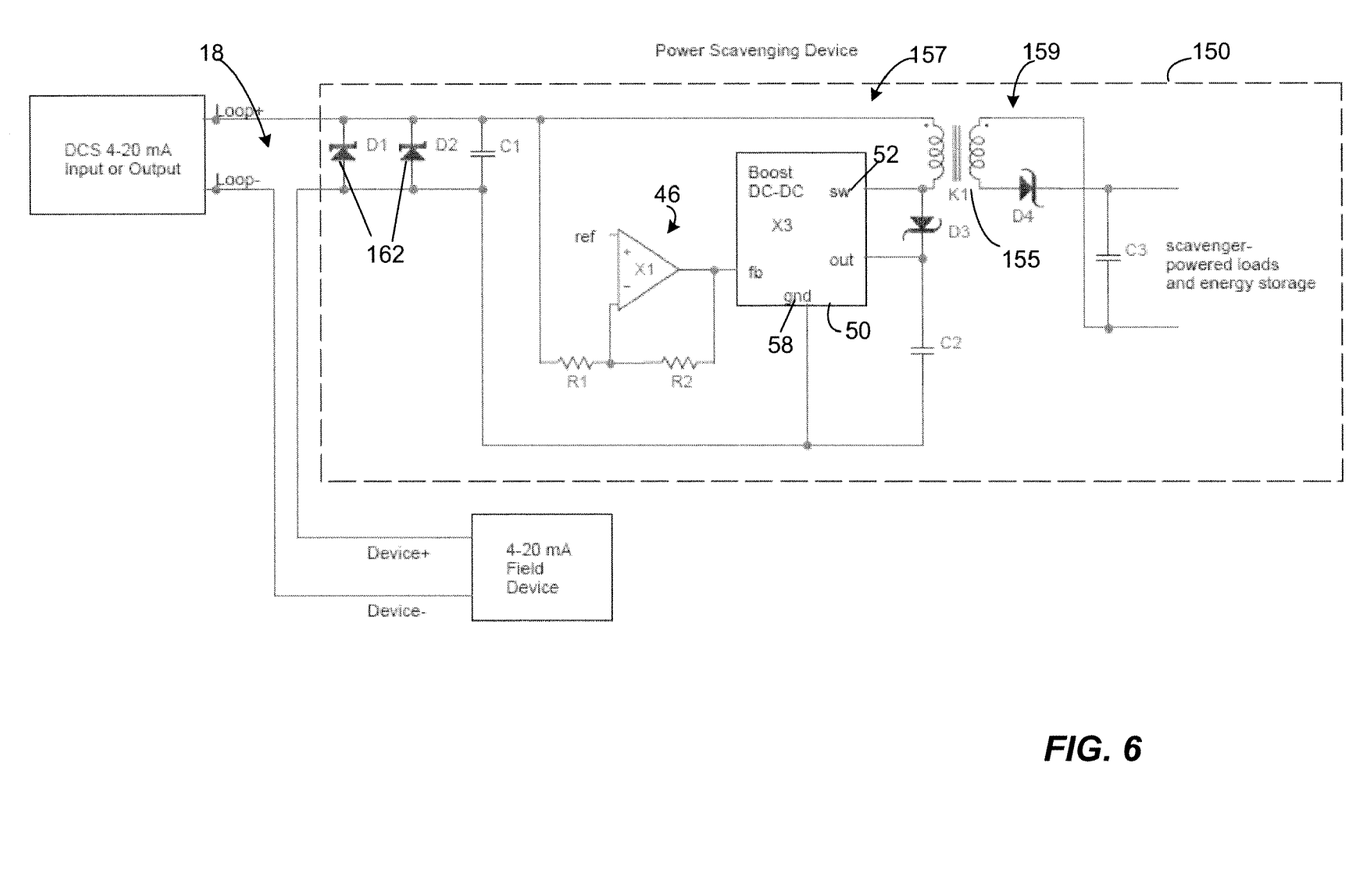
FIG. 6 is an electrical diagram of an input regulated DC to DC converter with an isolation transformer used for Intrinsic Safety (IS) energy limiting.

Because an input regulated transformer consistent with the embodiments disclosed herein is particularly well-suited for harvesting power for a power storage device, meeting the Intrinsic Safety (I.S.) limitations is clearly a concern in the implementation of such a transformer. FIG. 6 illustrates an isolated input regulated DC to DC transformer 150 used for power scavenging in current loop 10. The DC to DC transformer or power scavenging device 150 provides a fault energy limitation by means of an isolation transformer 155. Importantly, the isolation transformer 155 may effectively replace the inductor 44 in addition to ensuring operational safety. Meanwhile, the switching circuitry, such as the controller 50 working in cooperation with the feedback regulator 46, may generate PWM pulses in the same manner as in the embodiment of FIG. 3 irrespective of whether the power is supplied to the inductor 44 or the isolation transformer 155. The transformer coils wired to a circuit side 157 of the scavenging device 150 may be used to accumulate electric current when the switch pin 52 is switched to the ground pin 58 while inducing the opposite current in the coils connected to a load side 159. In other words, the isolation transformer 155 may be regarded as an inductor with an additional function of an electrostatic shield.

Referring back to FIG. 3, there is a direct discharge path from the output 22 back to the input 18 in a fault condition caused by the shorting of the flyback diode 60. Additionally, the internal circuitry of the controller 50 may similarly create a virtually resistance-free path between the output 22 and the input 18. By contrast, the isolation transformer 155 in the embodiment illustrated in FIG. 6 prevents the energy from being transferred back to the input 18. As one skilled in the art will recognize, an isolation transformer may be considered fail-safe for all practical purposes as long as the proper transformer with the corresponding core saturation characteristics is selected.

Further, the coil ratio of the isolation transformer 155 may be selected to additionally provide a voltage transformation desirable in certain applications. Thus, rather than using additional circuitry to regulate the voltage supplied to the power load, the isolation transformer 155 may provide an efficient means of controlling the output voltage. Moreover, a transformer may be constructed with multiple windings in order to provide multiple outputs, if required in a particular application.

It will be further recognized that it may not be necessary to maintain absolute isolation between the supply circuit side 157 and the load side 159. In particular, feedback voltage or power signals may be supplied from the load side 159 to the supply side 157 for reference or additional regulating purposes as long as the connections across the isolation boundary include adequately sized infallible resistors. Also, it may be necessary to limit the power transferred through the transformer in the forward direction, or in the direction from the supply side 157 to the load side 159. These limitations can help achieve the desired limits on the power transfer in the opposite direction. Although elements performing these functions are not shown in FIG. 6, it will be noted here that these forward limitations may be achieved by a shunt regulator connected at the input to the transformer on the supply side 157.

In reference to FIG. 6, clamp diodes 162 may be additionally connected across the input terminals 18 to limit the voltage at the input of the power scavenging device 150 in order to establish a maximum voltage in fault conditions for I.S. purposes. One skilled in the art will recognize that the clamp diodes 162 have no effect on the scavenging device 150 in normal operating modes of the device 150.

Figure 7:
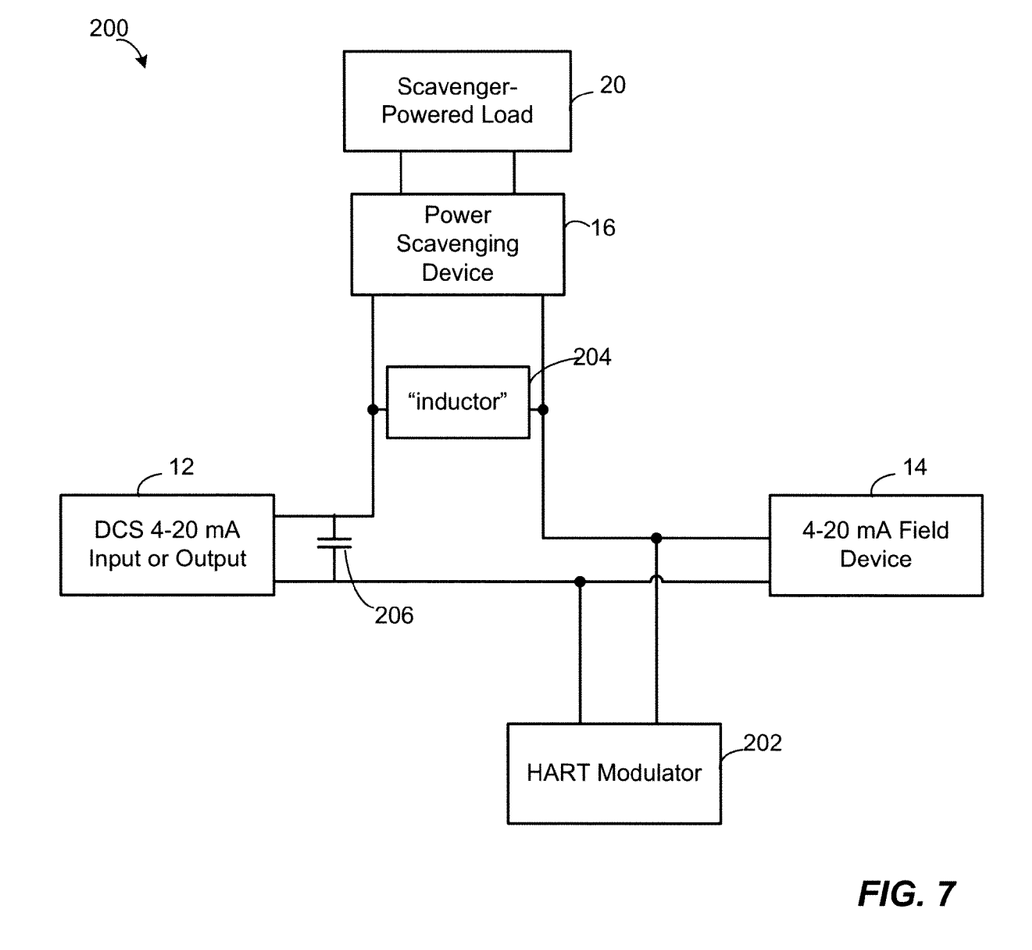
FIG. 7 is a schematic representation of an input regulated DC to DC converter with integral filtering characteristic.

FIG. 7 illustrates another embodiment of a power scavenging device using an input regulated DC to DC converter. Here, a current loop 200 includes a HART communicator 202 in addition to the DCS 12 and the field device 14 discussed above in reference to FIG. 1. The HART modulator 202 is connected across in parallel with the field device 14 in order to modulate voltage across the field device. As is known in the art, the ability to modulate voltage across a circuit depends on the impedance of the circuit. In particular, low impedance of the circuit requires a modulating circuit to spend a large amount of energy. Meanwhile, the DCS 12 could be a battery with a very low impedance and thus a typical 4-20 mA current loop is not conducive to HART communications. It is therefore desirable to increase the impedance of the loop 200. Moreover, it is desirable to meet this objective without using such conventional means as an inductor because an inductor would shunt the usable power. Thus, while it may be possible to increase the impedance of the loop 200 with an inductor, it may not be possible to scavenge enough power from the loop 200 in order to power the HART communication circuit 202.

In accordance with an embodiment illustrated below, the power scavenging device 16, in addition to providing power to the load 20, appears as a virtual inductor 204 connected in series with the field device 14. The virtual inductor 204 is not a physical device separate from the power scavenging device 16. Rather, a particular embodiment of the scavenging device 14 presents the device 14 to the circuit 200 as an inductor so that the HART communicating circuit 202 may modulate signals over the wires of the circuit 200. Additionally, a capacitor 206 provides a filtering function in order to smooth out the sudden changes in current which may interfere with HART communications.

Figure 8:
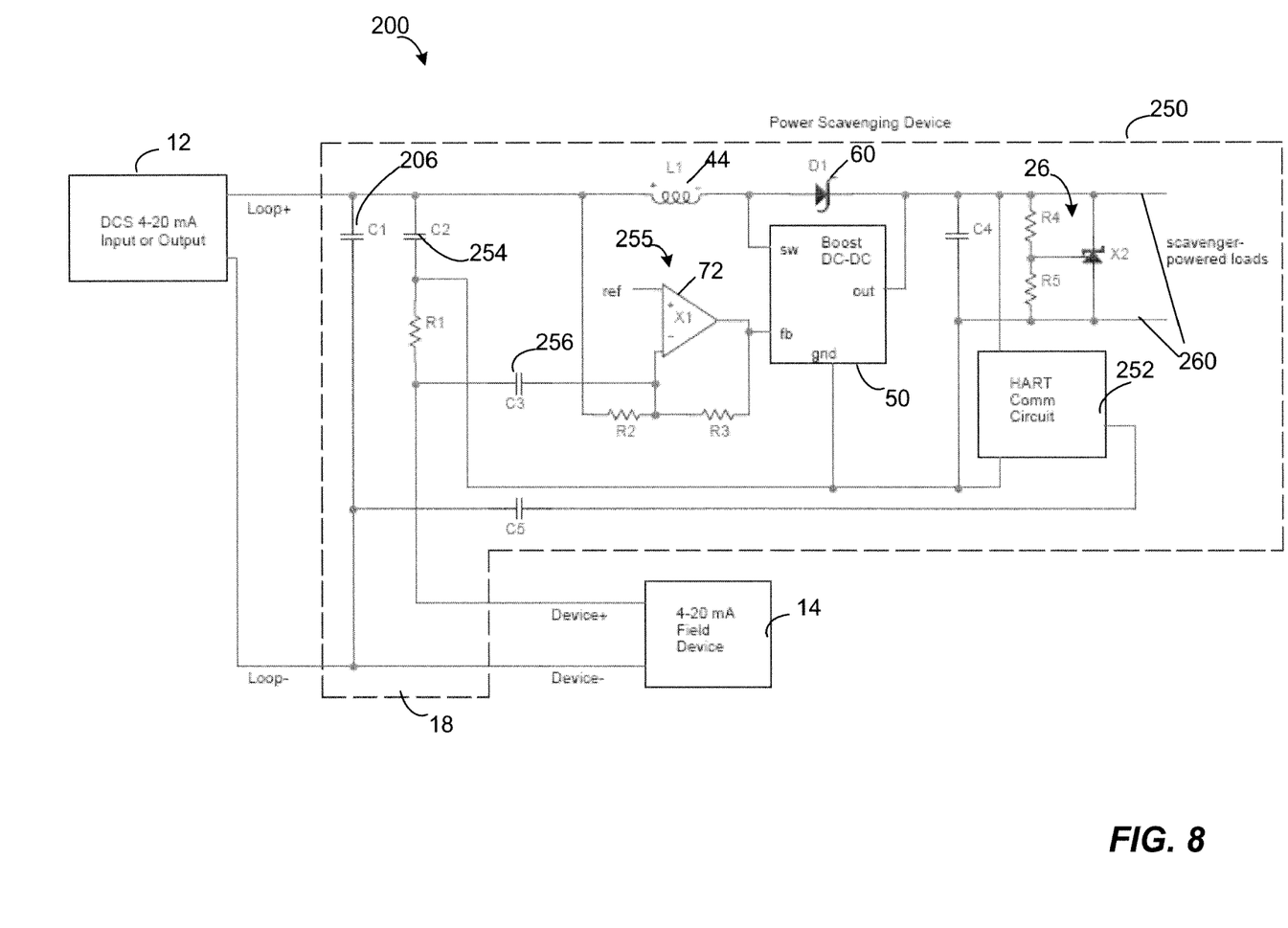
FIG. 8 is an electrical diagram of an input regulated DC to DC converter with integral filtering characteristic including a HART communication circuit.

A power scavenging device 250 represented schematically in FIG. 8 operates in such a way as to control the rate of change of current through the power scavenging device 250 thereby creating AC impedance. Additionally, the power scavenging device 250 reduces the noise level and ensures that the circuit 200 is conducive to voltage modulation and, in particular, to HART communications. As illustrated in FIG. 8, the power scavenging device may power a HART communication circuit 252 and may, in this particular embodiment, include the HART communication circuit 252 as an integral component.

As illustrated in FIG. 8, the capacitor 206 is connected in parallel with the field device 14 in order to filter out the loop noise. However, the capacitor 206 need not be part of the scavenging device 250 and may be provided separately, as illustrated in FIG. 7. Additionally, an input noise filter 254 is connected in series with the DCS 12 and the field device 14. Similarly to other embodiments discussed herein, the selection of the input noise filter 254 is a function of the operating frequency of the controller 50 as well as of the allowable noise amplitude at the input terminals 18. For example, a 1 uF capacitor may be used as the input filter 254 in a 4-20 mA circuit loop with the allowable voltage drop of ~1V and the voltage output to a scavenger load of ~3V. One skilled in the art will appreciate, however, that the input filter 254 in this and other embodiments may also be considerable larger.

The feedback circuit 255 functions in a manner largely similar to the operation of the feedback circuit 46 illustrated in FIG. 3. However, the feedback circuit 255 additionally includes a capacitor 256 effectively coupling a signal indicative of the current entering the scavenging device 250 to the inverting input of the amplifier 72. This configuration provides a dynamic characteristic of limiting the rate of change of a current 258 through the scavenging device 250 and into the field device 14. Additionally, the combination of the energy storage in the capacitor 206 and the limited rate of change of current through the scavenging device 250 provides the filtering function which can isolate the communication of the HART communication circuit 252. The limited rate of change of the current 258 through the scavenging device 250 additionally functions as a series impedance for the loop current.

The power scavenging device 250 may be further improved by clamping the voltage at the input terminals of the device 250 by means of a breakdown diode, for example. Moreover, an isolation transformer similar to the transformer 155 illustrated in FIG. 6 may be used in place of the inductor 44 to provide I.S. energy limiting. The isolation transformer used in place of the inductor 44 may further include a coil configuration suitable for adjusting the output voltage. One skilled in the art will appreciate that various aspects of the embodiments illustrated in FIGS. 1-8 may be combined to achieve various application goals.

Additionally, the scavenging device 250 may be provide multiple outputs and may maintain each output voltage at a different level by using shunt regulators, for example. FIG. 8 illustrates a typical configuration of the shunt regulator 26 which dissipates excess power provided to a power load connected to an output terminal pair 260. Because an input regulated DC to DC converter harvests the available power at a given input and at a regulated voltage drop, additional voltage regulators may be required to provide regulated voltage to scavenger-powered loads. It is contemplated that the embodiment illustrated in FIG. 8 may provide power to a radio transceiver as well to as to a HART communication circuit. Additionally, the excess power may be stored in a power storage device, such as the device 24, instead of being dissipated by a shunt regulator.

It is further contemplated that the filter function of the scavenging device 250 may be selectable. By being able to turn off the filtering functionality when it is not required, users of the device may find additional applications for a scavenging device discussed herein.

Generally in respect to the embodiments discussed above, all of the relevant circuitry may be integrated in an ASIC to reduce the circuit footprint, and allow for better control over circuit parameters. Also, while an existing boost DC to DC controller may be used, the controller may also be constructed using discrete components or in any manner known in the art. Similarly, an inductor or a transformer used in the embodiments discussed above may be provided in an integral package with the controlling circuitry. It is also contemplated that the resistors and other components providing regulatory functionality to the circuits may be provided in an adjustable format. Alternatively, the packaging may be designed to facilitate easy removal and replacement of such components as current sensors, feedback voltage regulators, and other components with application-specific values. It should be further noted that while the embodiments discussed above pertain largely to 4-20 mA current loops and to HART communications, the same concepts may be applied to similarly enable other communication schemes, such as Fieldbus, for example.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of scavenging power in a circuit including a power source and a power consuming device, wherein the power source generates electric current that varies within a certain range to define signaling between the power source and the power consuming device to control the power consuming device, the method comprising:
   connecting a power scavenging device having an input terminal pair and an output terminal pair to the circuit via the input terminal pair;
   dynamically regulating a voltage drop across the input terminal pair of the power scavenging device;
   harvesting electrical energy available at the regulated voltage drop from the electric current flowing through the input terminal pair of the power scavenging device, including controlling an amount of the harvested electrical energy based on the electric current so as to not interfere with the signaling between the power source and the power consuming device; and
   providing the harvested electrical energy at the output terminal pair of the power scavenging device.

2. The method of claim 1, wherein dynamically regulating a voltage drop across the input terminal pair includes maintaining a constant voltage drop across the input terminal pair when the electric current in the circuit varies with time.

3. The method of claim 1, wherein further comprising connecting a scavenger powered load to the output terminal pair.

4. The method of claim 1, wherein providing the harvested electrical energy at the output terminal pair includes regulating a voltage drop across the output terminal pair of the power scavenging device using an adjustable shunt regulator.

5. The method of claim 1, wherein harvesting electrical energy includes storing the electrical energy in a power storage device.

6. The method of claim 5, wherein the power storage device is a supercapacitor.

7. The method of claim 1, wherein connecting the power scavenging device to the circuit includes connecting the power scavenging device in series with the electrical power source.

8. The method of claim 7, wherein the power consuming device has a time-variable power requirement; and wherein
   connecting the scavenging device to the circuit further includes connecting the power scavenging device in series with the power consuming device; and wherein dynamically regulating a voltage drop across the input terminal pair includes regulating the voltage drop according to a power requirement of the power consuming device.

9. The method of claim 1, wherein dynamically regulating the voltage drop includes using an input voltage regulating circuit to generate a voltage control signal and an inductor to accumulate current.

10. The method of claim 9, wherein using the inductor includes adjusting a period of time during which the inductor accumulates current in one cycle of operation based on the voltage control signal.

11. The method of claim 1, wherein regulating the voltage drop across the input of the power scavenging device includes regulating the voltage drop according to an inverse relationship between input current entering through one of the pair of input terminals of the power scavenging device and the voltage drop across the input terminal pair of the power scavenging device.

12. The method of claim 11, wherein regulating the voltage drop across the input of the power scavenging device further includes maintaining the voltage drop in a range between a minimum tolerable value and a maximum tolerable value.

13. The method of claim 11, wherein regulating voltage drop across the input of the power scavenging device further includes regulating the voltage drop using a current sensor and an inverting amplifier, wherein the inverting amplifier generates a feedback signal controlling a period of time during which an inductor accumulates current in one cycle of operation and wherein the inductor supplies current to the output terminal pair of the power scavenging device.

14. The method of claim 1, wherein harvesting electrical energy available from an electric current includes limiting an amount of energy which can be transferred from the power scavenging device to the circuit in a fault condition.

15. The method of claim 14, wherein limiting the amount of energy which can be transferred from the power scavenging device to the circuit in a fault condition includes cyclically accumulating and discharging electrical current flowing through an isolation transformer; wherein a first winding of the isolation transformer is connected to a positive terminal of the input terminal pair of the power scavenging device and a second winding of the isolation transformer is an output of the power scavenging device.

16. The method of claim 15, further including:
limiting the amount of power which can be transferred to the output of the power scavenging device across the isolation transformer.

17. The method of claim 15, further including:
providing at least a third winding to the isolation transformer, wherein the second and the third windings provide separate outputs of the power scavenging device.

18. The method of claim 15, wherein limiting the amount of energy which can be transferred from the power scavenging device to the circuit in a fault condition includes meeting an intrinsic safety energy limitation of a scavenger powered load, wherein the scavenger powered load is connected to the output of the power scavenging device.

19. The method of claim 1, wherein regulating a voltage drop across the input of the power scavenging device further includes providing a line filter characteristic in the power scavenging device, wherein the line filter characteristic allows for voltage modulation across the.

20. The method of claim 19, wherein providing the line filter characteristic includes regulating a rate of change of current flowing through the power scavenging device.

21. A scavenging circuit for harvesting excess power from a source circuit, comprising:
a pair of input terminals to connect the scavenging circuit to a source circuit, wherein the source circuit includes a power source and a power consuming device that communicate information by varying current in the source circuit within a certain range;
a voltage regulating circuit to generate a voltage regulation signal based on a voltage drop across the pair of input terminals, and further based on the current in the source circuit so as to not interfere with the signaling between the power source and the power consuming device;
an accumulation element for temporary accumulation of electric energy harvested from the electric circuit;
a boost DC to DC controller that controls the accumulation element based on the voltage regulation signal from the voltage regulating circuit; and
a pair of output terminals to output electrical power accumulated by the accumulation element; wherein the scavenging circuit maintains a controlled voltage across the pair of input terminals.

22. The scavenging circuit of claim 21, wherein the current accumulating circuit element is an inductor.

23. The scavenging circuit of claim 21, wherein the current source circuit is a DC current varying with time.

24. The scavenging circuit of claim 21, wherein the DC to DC controller is a boost DC to DC controller including:
a switching pin connected to one of the terminals of the accumulation element; and
a ground pin connected to ground; wherein
the scavenging circuit electrically connects the switching pin to the ground pin in a first mode of operation to cause the accumulation element to build up electrical current, and wherein the scavenging circuit disconnects the switching pin from the ground pin in a second mode of operation to cause the accumulation element to direct the built up electrical current to one of the pair of output terminals.

25. The scavenging circuit of claim 24, wherein the DC to DC controller further includes a feedback pin through which the DC to DC controller receives the signal generated by the voltage regulating circuit; wherein the DC to DC controller determines the amount of time the DC to DC controller operates in the first mode of operation and the amount of time the DC to DC controller operates in the second mode of operation based on the signal received via the feedback pin.

26. The scavenging circuit of claim 21, further comprising a capacitor connected across the pair of output terminals that filters output voltage at the pair of output terminals.

27. The scavenging circuit of claim 21, wherein the voltage regulating circuit includes an inverting amplifier and a current sensor operatively coupled to the inverting amplifier.

28. The scavenging circuit of claim 21, wherein the voltage regulating circuit includes a gain-limiting resistor to generate a stronger voltage regulation signal when the current is weaker.

29. The scavenging circuit of claim 21, wherein the accumulation element is an isolation transformer that provides a fault energy limitation.

30. The scavenging circuit of claim 29, wherein the isolation transformer includes a:
a first coil in electrical communication with the pair of input terminals; and
a second coil in electrical communication with the pair of output terminals and separated from the first coil by a core element; wherein the first coil induces current in the second coil during operation of the scavenger circuit.

31. The scavenging circuit of claim 29, wherein the isolation transformer includes a plurality of windings to provide voltage to a corresponding plurality of outputs.

32. A circuit for communicating information in a process control environment, comprising:
a first device that generates a DC current signal that varies with time and propagates the signal through the circuit;
a second device that receives the signal and performs a function in the process control environment according to the signal;
a power scavenging device connected in series with the first device and with the second device, wherein the power scavenging device dynamically regulates a voltage drop across the power scavenging device to harvest excess electrical power at the regulated voltage drop, the power scavenging device including:
a pair of input terminals connected to the circuit; and
a pair of output terminals for connecting to a consumer circuit.

33. The circuit of claim 32, further including an adjustable shunt regulator adapted to regulate an output voltage across the pair of output terminals of the power scavenging device.

34. The circuit of claim 32, wherein the first device is a controller associated with a distributed control system, and wherein the DC current signal is in the 4 to 20 mA range.

35. The circuit of claim 32, wherein the consumer circuit includes a supercapacitor coupled to the pair of output terminals of the power scavenging device.

* * * * *